Patented May 11, 1943

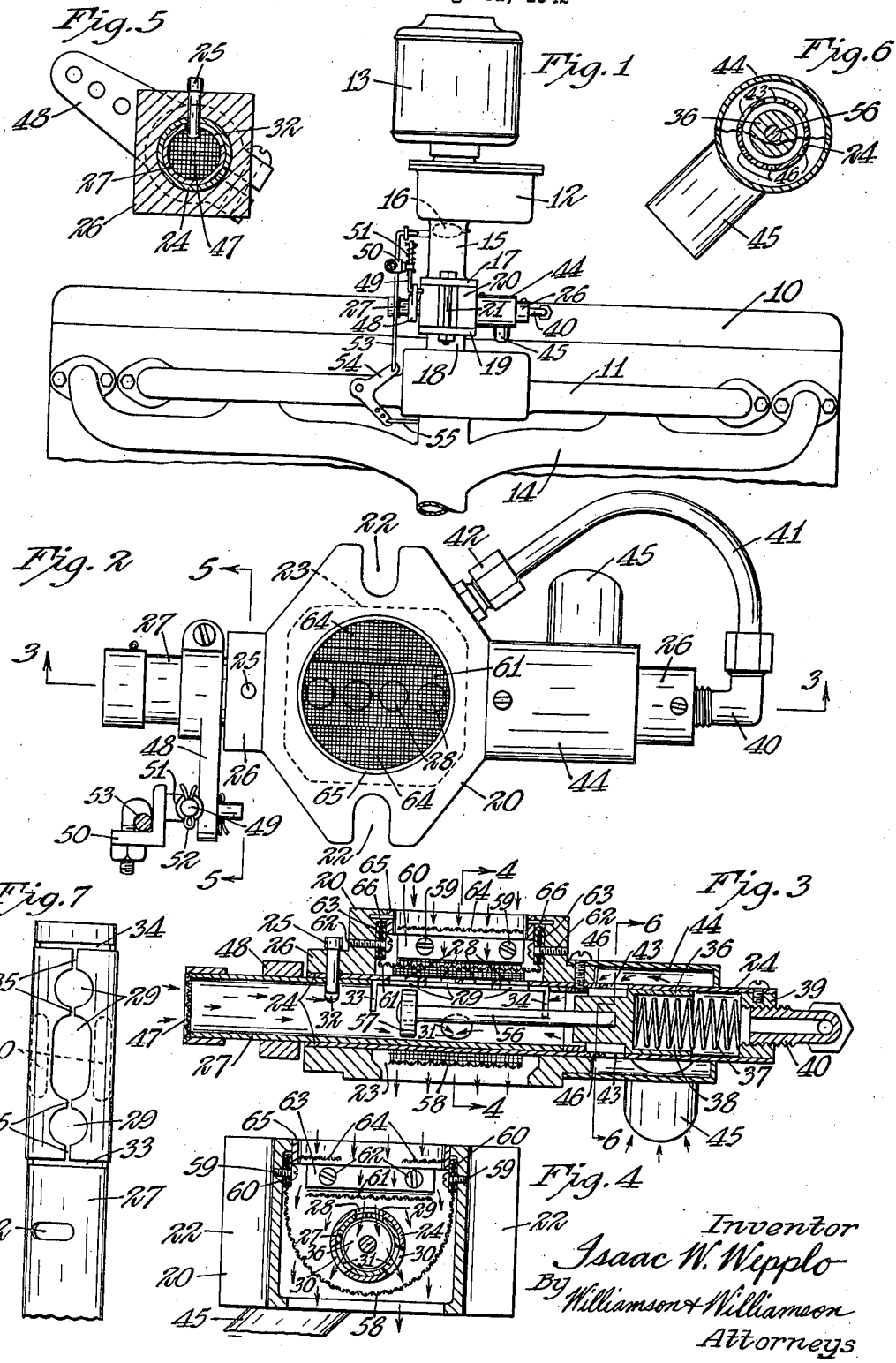

2,318,824

UNITED STATES PATENT OFFICE 2,318,824

FUEL VAPORIZER

Isaac W. Wepplo, Minneapolis, Minn.

Application August 31, 1942, Serial No. 456,753

3 Claims. (Cl. 48—180)

This invention relates to fuel vaporizers for internal combustion engines.

In general the device includes a mixing chamber adapted to be located between the carburetor and the intake manifold of an engine, said device receiving the flow of more or less vaporized fuel from the carburetor and mixing therewith a supply of fresh air from the outer atmosphere under a relatively high velocity condition in order to break up and properly vaporize the heavier and less volatile portions of the fuel.

In my prior Patent No. 2,010,973, issued August 13, 1935, and entitled "Gasoline vaporizer" there is disclosed a device generally similar to that shown in the drawing, and described below, but certain improvements have been made which render the vaporizer considerably more efficient. The fresh air inlet control in my prior patent consisted of a port with a spring pressed ball which is pulled away from its seat by the partial vacuum in the intake manifold. As the intake negative pressures became greater the ball would be pulled away from the seat permitting an inflow of supplementary fresh air, and, conversely, as the negative pressures in the intake became less the ball would move toward the weight thus reducing the amount of additional fresh air introduced into the intake system. However, the ball was found to have certain disadvantages in that its action was too abrupt for even and highly accurate control of the air supply. In the present disclosure the ball has been replaced by a reciprocating piston and the piston is so constructed that even and accurate control results.

I have also provided screens in the vaporizer to assist in more completely breaking up the fuel as the additional air is mixed with it and the flow through the vaporizer is controlled in such a manner that accumulation of moisture on the screens is effectively prevented.

My invention also includes means for insuring smooth action of the air control piston without sudden jerky movements and without any chattering action.

The above and other objects and advantages of the invention will more fully appear from the following description made in connection with the accompanying drawing, wherein like reference characters refer to the same parts throughout the views, and, in which:

Fig. 1 is a side elevation of an upper portion of the internal combustion engine showing the air cleaner carburetor vaporizer and intake manifold;

Fig. 2 is an enlarged plan view of the vaporizer removed from the engine;

Fig. 3 is a section taken approximately on the line 3—3 of Fig. 2;

Fig. 4 is a section taken approximately on the line 4—4 of Fig. 3;

Fig. 5 is a section taken approximately on the line 5—5 of Fig. 2;

Fig. 6 is a section taken approximately on the line 6—6 of Fig. 3; and

Fig. 7 is a plan view of one of the flow control sleeves.

In Fig. 1 there is shown the upper portion of an internal combustion engine 10 upon which is mounted an intake manifold 11 which has connected therewith a carburetor 12 upon which is mounted an air cleaner 13. The exhaust manifold 14 is also shown but it bears no relation to the present invention. The lower portion of the carburetor 12 includes a pipe 15 having a butterfly valve 16 therein. The lower end of the pipe 15 is provided with a flange 17. The central portion of the intake manifold 11 includes a short pipe section 18 having a flange 19 similar to the flange 17 on the carburetor outlet pipe 15. Normally, the flanges 17 and 19 are bolted together.

In utilizing my improved vaporizer the flanges 17 and 19 are separated and the vaporizer body 20 is interposed between said two flanges 17 and 19 and the unit is connected by nutted bolts 21 which extend through the flanges 17 and 19 and lie in notches 22 formed in the vaporizer body 20.

The vaporizer body 20 defines a chamber 23 within which is mounted a stationary sleeve 24 which is secured against rotation by a pin 25 extending through a squared projection 26 on the left-hand side of the vaporizer body 20 as viewed in Figs. 1 through 3. The sleeve 24 extends to the right through the vaporizer body and some distance outwardly therefrom. Within said stationary sleeve 24 is mounted an inner sleeve 27 which is rotatable relative to the stationary sleeve 24. This inner sleeve 27 is shown alone in Fig. 7. The stationary sleeve 24 is provided with a plurality of apertures 28 in its upper side which are adapted to register with apertures 29 formed in the inner movable sleeve 27 when said sleeve is rotated to the proper position. Said outer stationary sleeve 24 is provided with lower outlet apertures 30 which are adapted to register with apertures 31 formed in the inner movable sleeve 27. The limit of movement of sleeve 27 is determined by the length of the slot 32 formed in said inner sleeve 27. The pin 25 which secures the stationary sleeve 24 extends through the slot 32 in the sleeve 27 and thus limits its rotary or oscillatory movement. The length of said slot is such that the openings in the inner movable sleeve 27 can be brought into full registry with the openings in the stationary sleeve 24 or completely out of registry thereof.

It should be noted in Fig. 7 that the sleeve 27 is partially cut transversely at points 33 and 34 and that it is also cut longitudinally at points 35. Between the cuts 33 and 34 the sleeve 27 is slightly larger than the end portions of the sleeve and said intermediate enlarged portion with its longitudinal split will closely fit the interior of the stationary sleeve 24 so that when the openings in the two sleeves are out of registration there will be a tight seal between the two sleeves to prevent any leakage from the interior of the movable sleeve 27 to the exterior of that portion of sleeve 24 which lies within the chamber 23 in the vaporizer body 20.

As best shown in Fig. 3 the outer sleeve 24 carries a piston 36, which, as illustrated, has its right-hand portion closely fitting the interior of the sleeve 24 and its left-hand portion reduced in diameter so that that portion of the piston will enter the inner sleeve 27. As is further shown the reduced part of the piston 36 is spaced a small distance from the interior wall of the inner sleeve 27. A coil spring 37 has one end seated in a socket 38 formed in the right-hand side of the piston 36 and the other end of said spring 37 rests against a collar 39 secured in the right-hand end of the outer sleeve 24. A nipple 40 is threaded into the collar 39 and connected with a tube 41 which connects at its opposite end with a nipple 42 threaded into the body 20 and communicating with the vaporizer chamber 23.

Just beyond the right-hand end of the inner sleeve 27 an air inlet aperture 43 is formed in the wall of the outer sleeve 24. Said aperture 43 provides communication with an air inlet chamber 44 which surrounds a portion of the outer sleeve 24 and said air inlet chamber 44 is provided with a downwardly extending air inlet pipe 45. Adjacent the air inlet aperture 43 in the sleeve 24 is a plurality of small air inlet openings 46 which lie immediately adjacent the right-hand end of the inner sleeve 27.

The left-hand end of the inner sleeve 27 extends outwardly beyond the outer sleeve 24 and is provided with a screened air inlet opening 47. The exposed left-hand end of the inner sleeve 27 has a lever 48 secured thereto and the outer end of said lever 48 is connected to a link 49 which extends through a connecting member 50. and that portion of said link 49 which extends through said connecting member has a spring 51 thereon, said spring at its two ends bearing against the connecting member 50 and a cotter key 52. The connecting member 50 is mounted upon a rod 53 which is connected between the carburetor butterfly valve 16 and a bell crank 54 which is shown in Fig. 1 to be pivotally mounted on a portion of the intake manifold 11 and one arm of said bell crank 54 is connected to the usual throttle control lever 55.

Extending to the left from the reduced end of the piston 36 and lying in the inner sleeve 27 is a stem 56 upon whose left-hand end is mounted a head 57 which is somewhat smaller in diameter than the interior diameter of said inner sleeve 27. The stem 56 and head 57, of course, are adapted to move with the piston 36.

A substantially U-shaped screen 58 is secured within the vaporizer chamber 23 by means of short bolts 59 which also pass through metal clips or plates 60 bent over the upper edges of said U-shaped screen 58. The screen, as best shown in Fig. 4, extends downwardly in the chamber 23 and below the two concentric sleeves 24 and 27.

Above said sleeves 24 and 27 is a horizontally disposed screen 61 which is secured to the sides of the vaporizer chamber 23 by means of bolts 62 which extend through metal clips 63 similar to the clips 60. A pair of screens 64 are soldered or otherwise suitably secured to a ring 65 which is pressed into the circular inlet openings at the top of the vaporizer body 20 and said ring is further secured by pins 66 shown in Fig. 3.

When the device is installed in the fuel intake line of an internal combustion engine as illustrated in Fig. 1, the movable inner sleeve 27 is connected to the control connections of the carburetor butterfly throttle valve 16 in such a way that when the throttle is closed the apertures in the intermediate portions of the two sleeves 24 and 27 are out of registration so that there is no flow communication between the interior of the inner sleeve 27 and the exterior of the outer sleeve 24 and, of course, the interior of the vaporizer chamber 23. When the butterfly throttle valve 16 is first opened to admit an increased amount of fuel to the intake 11 there is a comparatively low vacuum in said intake 11. However, as the engine begins to pick up speed and turn over without a great deal of laboring the vacuum in the intake 11 will increase considerably. After the vacuum has increased to a predetermined degree it will be sufficiently strong to overcome the strength of the spring 37 which bears against the piston 36 in the outer sleeve 24. The piston 36 will then begin to move from its position of rest. With its enlarged portion abutting against the right-hand end of inner sleeve 27. As soon as the piston 36 has moved away from the right-hand end of the inner sleeve 27 air from the outer atmosphere will be admitted through the air inlet pipe 45, air inlet chamber 44 and the series of small air inlet openings 46 in the outer sleeve 24. Due to the reduced diameter of the left-hand end of the piston 36 air is permitted to flow past the piston and into the inner sleeve 27. It then flows through the upper and lower side wall openings of the two sleeves 24 and 27 which are partially or entirely in registration depending upon the position of the throttle with which the inner sleeve 27 is actuated. As the vacuum increases in the intake manifold 11 its effect is produced on the piston 36 through the tubing 41 and the piston will move to a position shown in Fig. 3. This exposes the larger air inlet openings 43 to provide for an increased flow of fresh air from the outer atmosphere. Due to the relatively high vacuum produced in the intake manifold there is a high velocity flow of air and fuel from the carburetor 11 through the vaporizer chamber 23 so that when unvaporized particles of the less volatile portions of the fuel strike the various chambers in the vaporizer chamber 23 they will be broken up. Unless these less volatile particles of fuel are vaporized they do not form an effective part of the combustible mixture, but as soon as they are broken up by the high velocity impingement of said particles of fuel against the screens in the vaporizer it is necessary that more air be supplied to the mixture than enters through the carburetor. Otherwise the mixture would become too rich. Therefore, by breaking up the normally unvaporized portions of the fuel through the action of the flow from the carburetor against the screens and the additional high velocity flow entering in through the air inlet pipe 45 and the sleeves 24 and 37 said additional air also acts to keep the mixture from becoming too rich and keeps it at the desired degree of richness. The regular mixture coming from the carburetor and striking the screens 48 at the sides and lower portion of the screen was found to tend to deposit unvaporized fuel at the lower side portions of the screen but when the apertures 30 and 31 in the sleeves 37 and 24 respectively were directed downwardly and diagonally outwardly as shown the additional air supply under high velocity kept the screens open in addition to sustaining in more completely vaporization all of the fuel.

While the main auxiliary air supply enters through the air inlet pipe 45 there is a certain amount which also enters the screened opening 47 at the left-hand end of the inner sleeve 27. With the piston 36 in a position further to the left than that shown in Fig. 3 a certain amount of air would enter said screened opening 47 and pass around the head 57 on the end of the stem 56. This air is entering at all times that the engine is running and, of course, the proper carburetor adjustment must be made to provide for the normal idling mixture. When the piston 36 is pulled to the right, however, as shown in Fig. 3 the amount of air which enters the screened opening is increased as soon as the left-hand openings 28 and 29 in the sleeves 24 and 27 are exposed as illustrated.

When a motor vehicle is laboring under a load or climbing a steep hill the amount of vacuum in the intake 11 is reduced and the pull on the piston 36 is lessened thus permitting the spring 37 to move the piston 36 to the left and reduce or in some cases cut off the air entering the holes 43 and 46 in the right-hand portion of the outer sleeve 24 and thus even though the complementary passages or openings in the sleeves are in registration with the throttle open the additional air supply has been temporarily stopped. By reason of this fact a sufficiently rich mixture is fed to the intake manifold 11 to permit the engine to work at its best efficiency but as soon as the load is taken off of the engine the auxiliary air supply is resumed and the mixture cut down with the accompanying more complete vaporization of the fuel and increase in mileage per gallon.

The piston type of air control disclosed herein is considerably better than the ball type shown in my above identified patent since the ball operates too quickly in the increase of the auxiliary air supply and the performance is not smooth. In the present construction, however, as soon as the piston moves slightly to the right from its closed position air enters through the small openings 46 and this supply is gradually increased as the enlarged portion of the piston 36 exposes the openings 43. Thus the transition is extremely smooth and is imperceptible when it is made. Furthermore, the small openings 46 prevent the piston from chattering as it starts to move. This is a drawback which was found in the ball type of control and has been eliminated in the new construction.

If the opening movement of the throttle 16 is greater than the movement provided for by the pin 25 in the slot 32 in the inner sleeve 27 the spring 51 on the upper end of the link 49 permits the connecting member 50 to move upwardly relative to said link 49.

From the foregoing description it will be seen that I have provided an improved fuel vaporizer for internal combustion engines wherein additional air is supplied with cyclonic action to more completely break up heavy hydrocarbons in the fuel which are not vaporized with the usual carburation, and I have also provided improved means as compared with my prior patent for controlling the flow of auxiliary air so that it does not permit such auxiliary air to flow into the fuel mixture when a more concentrated and rich mixture is needed when under heavy load conditions.

It will, of course, be understood that various changes may be made in the form, details, arrangement and proportions of the various parts without departing from the scope of my invention.

What is claimed is:

1. A fuel vaporizer for internal combustion engines adapted for use in the intake passage of the engine between the carburetor and intake manifold thereof comprising, a casing providing a chamber to be located between said carburetor and manifold and having an inlet and an outlet adapted for communication with said carburetor and manifold respectively, a sleeve extending into said chamber having firing charge inlet and outlet apertures in its wall and having an air inlet therein communicating with said charge outlet apertures, a piston slidable in said sleeve, means for yieldably urging said piston in one direction to close said air inlet, and a negative pressure connection between said intake manifold and said sleeve at one side of said piston to move said piston against said yieldable means, and a screen in said chamber in the flow path of vapors issuing from the outlet apertures in the wall of said sleeve.

2. A fuel vaporizer for internal combustion engines adapted for use in the intake passage of the engine between the carburetor and intake manifold thereof comprising, a casing providing a chamber to be located between said carburetor and manifold and having an inlet and an outlet adapted for communication with said carburetor and manifold respectively, a sleeve extending into said chamber having firing charge inlet and outlet apertures in its wall and having an air inlet therein communicating with said charge outlet apertures, a piston slidable in said sleeve, means for yieldably urging said piston in one direction to close said air inlet, and a negative pressure connection between said intake manifold and said sleeve at one side of said piston to move said piston against said yieldable means, and a part of said piston closely fitting said sleeve at said air inlet in one position thereof and having a portion of slightly reduced diameter movable to a position adjacent said air inlet to provide a limited supply of fresh air from the atmosphere to said sleeve for mixture with the firing charge.

3. The structure in claim 2, and said sleeve having piston stop means incorporated therewith and also having an auxiliary air inlet communicating with the interior of the sleeve immediately adjacent said piston stop means.

ISAAC W. WEPPLO.